United States Patent
Langkabel et al.

(10) Patent No.: US 9,623,793 B2
(45) Date of Patent: Apr. 18, 2017

(54) METHOD FOR CONTROLLING A HEADLIGHT SYSTEM OF A MOTOR VEHICLE AND CONTROLLER AND DEVICE FOR CARRYING OUT THE METHOD

(71) Applicant: GM GLOBAL TECHNOLOGY OPERATIONS LLC, Detroit, MI (US)

(72) Inventors: Frank Langkabel, Rüsselsheim (DE); Carsten Neitzke, Hessen (DE); Justus Illium, Mainz (DE); Michael Rabe, Heidesheim (DE); Ingolf Schneider, Rüsselsheim (DE); Phillipp Roeckl, Aschaffenburg (DE); Rouven Haberkorn, Darmstadt (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/044,202

(22) Filed: Feb. 16, 2016

(65) Prior Publication Data

US 2016/0236611 A1    Aug. 18, 2016

(30) Foreign Application Priority Data

Feb. 16, 2015 (DE) .................. 10 2015 001 912

(51) Int. Cl.
*B60Q 1/08* (2006.01)
*B60Q 1/14* (2006.01)
*B60Q 1/16* (2006.01)

(52) U.S. Cl.
CPC .............. *B60Q 1/143* (2013.01); *B60Q 1/085* (2013.01); *B60Q 1/1423* (2013.01); *B60Q 1/16* (2013.01);

(Continued)

(58) Field of Classification Search
CPC .......... B60Q 1/08; B60Q 1/085; B60Q 1/115; B60Q 1/12; B60Q 2300/00;

(Continued)

(56) References Cited

U.S. PATENT DOCUMENTS 4,982,359 A    1/1991 Kamiyama et al.
6,459,387 B1   10/2002 Kobayashi et al.
(Continued)

FOREIGN PATENT DOCUMENTS

EP         1852305 A1      11/2007
FR         2839687 A1      11/2003
WO    WO 2009021594 A1 *   2/2009    .......... B60Q 1/1423

OTHER PUBLICATIONS

German Patent Office, German Search Report for German Application No. 102015001912.0, dated Nov. 3, 2015.

*Primary Examiner* — Vibol Tan
(74) *Attorney, Agent, or Firm* — Lorenz & Zopf, LLP (57) ABSTRACT

A method and apparatus for controlling a headlight system of a motor vehicle is disclosed. The headlight system can be actuated in at least two control modes, each having an associated, predetermined maximum main beam width. First, a current driving situation of the motor vehicle is captured on the basis of at least one operating, parameter of the motor vehicle. A current control mode is ascertained based on which control mode from at least two control modes matches a control mode assigned to the captured driving situation on the basis of the captured current driving situation and at least one-time or temporal parameter. The controller is shifted into the assigned control mode when the current control mode does not match the assigned control mode, wherein a maximum main beam width is set for the current driving situation.

14 Claims, 5 Drawing Sheets

(52) U.S. Cl.
CPC .. *B60Q 2300/056* (2013.01); *B60Q 2300/112* (2013.01); *B60Q 2300/322* (2013.01); *B60Q 2300/334* (2013.01)

(58) Field of Classification Search
CPC ............ B60Q 2300/10; B60Q 2300/12; B60Q 2300/13; B60Q 2300/14; B60Q 2300/30; B60Q 2300/32; B60Q 2300/40; B60Q 11/00; B60Q 2300/45; F21S 48/1721; F21S 48/1742; F21S 48/1757; F21V 23/0442
See application file for complete search history.

(56) References Cited

U.S. PATENT DOCUMENTS

| | | | | |
|---|---|---|---|---|
| 6,580,385 | B1* | 6/2003 | Winner | G01S 7/4972 |
| | | | | 180/169 |
| 9,313,862 | B1* | 4/2016 | Helton | H05B 37/0272 |
| 2007/0047244 | A1* | 3/2007 | Eberhardt | B60Q 1/085 |
| | | | | 362/464 |
| 2008/0015713 | A1* | 1/2008 | Pannwitz | B60W 50/00 |
| | | | | 700/8 |
| 2011/0245992 | A1* | 10/2011 | Stahlin | B60W 50/085 |
| | | | | 701/1 |
| 2014/0350836 | A1* | 11/2014 | Stettner | G01S 17/023 |
| | | | | 701/301 |
| 2015/0092431 | A1* | 4/2015 | Schneider | B60Q 1/143 |
| | | | | 362/466 |
| 2016/0068097 | A1* | 3/2016 | Langkabel | B60Q 1/1423 |
| | | | | 362/464 |

* cited by examiner

METHOD FOR CONTROLLING A HEADLIGHT SYSTEM OF A MOTOR VEHICLE AND CONTROLLER AND DEVICE FOR CARRYING OUT THE METHOD

CROSS-REFERENCE TO RELATED APPLICATION

This application claims priority to German Patent Application No. 102015001912.0, filed Feb. 16, 2015, which is incorporated herein by reference in its entirety.

TECHNICAL FIELD

The present disclosure pertains to a method for controlling a headlight system of a motor vehicle and a controller and device for carrying out the method.

BACKGROUND

More and more driver assistance systems for motor vehicles are including specialized control equipment for a headlight system are known for ensuring that a driver of the vehicle is able to see the stretch of road he or she will drive on as early as possible. At the same time, every effort is made to avoid dazzling other road users.

When driving on multilane roads or motorways, headlights may dazzle the drivers of oncoming vehicles or may dazzle the driver of a vehicle ahead of a given vehicle in a mirror causing annoyance to the road users which represents a condition of reduced traffic safety.

SUMMARY

The present disclosure provides a method, a controller and an associated device for carrying out the method, with which road users, particularly motor vehicle drivers, can be reliably protected from headlight dazzle. According to a first aspect of the present disclosure, a method for controlling a headlight system of a motor vehicle in one of at least two control modes. Each headlight system control mode has an associated, predefined maximum main beam width. In particular, a current driving situation of the vehicle is captured on the basis of at least one locally measured operating parameter of the vehicle. The captured current driving situation is used to determine whether a current control mode matches a control mode of the least two control modes that is assigned to the captured driving status. The controller is automatically shifted to the assigned control mode if the current mode does not match the assigned control mode, so that a maximum main beam width adapted to the current driving situation may be set. Changing the control mode to the assigned control mode can effectively help to avoid dazzling other road users while largely maintaining other functionalities of the headlight system.

In one embodiment of the method, the at least one operating parameter includes a current vehicle speed and the at least one time or temporal parameter includes a current timer status. As an operating parameter, the current vehicle speed provides information about the driving situation the vehicle is in at the time, and the current timer status offers a readily understandable historical background, so that the headlight system can be actuated in accordance with the driving situation and the historical background.

In one embodiment, the at least one operating parameter further includes a current turning or bend radius. The controller is shifted from a basic mode with one maximum main beam width to a first motorway mode with a first maximum main beam width that is more limited than the maximum min beam width of the basic mode to avoid dazzling the drivers of vehicles ahead via the mirror, if the current vehicle speed exceeds a first predefined speed threshold and the current bend radius exceeds a first predefined bend radius threshold, each continuously for a first predefined period of time. By limiting the maximum main beam width in the first motorway mode, dazzling of overtaking vehicles may be prevented. For example, an environment sensor installed in a vehicle, particularly a camera, may detect an overtaking motor vehicle before said vehicle moves within the dazzling range of the vehicle being overtaken.

In one embodiment, the current turning or bend radius is determined with the aid of a current yaw rate. In this way, the current yaw rate may be captured simply using a yaw rate sensor.

In one embodiment of the method, essentially the left side of the main beam spread is restricted. Consequently, the headlight performance particularly on the right side of the light spread is largely preserved.

In one embodiment, the controller is switched from the first motorway mode to a second motorway mode, with a second maximum main beam width more limited than the maximum main beam width of the base mode in order to avoid dazzling oncoming vehicles, if the current vehicle speed exceeds a second predefined speed threshold and the current bend radius exceeds a second predefined bend radius threshold, each continuously for a second predefined period of time. The second motorway mode is suitable for protecting oncoming traffic from headlight dazzle, if the camera installed in the vehicle does not detect the headlights of the approaching traffic, which may be due in particular to visibility barriers between the carriageways, such as vegetation or construction elements.

In one embodiment of the method, the maximum main beam width in the first motorway mode is wider than the maximum main beam width in the second motorway mode. In this way, the maximum main beam width is not limited unnecessarily in the first motorway mode.

In one embodiment of the method, the illumination area may be limited or reduced further still while in one of the motorway modes as appropriate to the situation and according to the method by an automatic headlight dipping system provided in the motor vehicle. In this way, the functionality of the automatic headlight dipping system is retained even when the motorway modes are activated. When the automatic headlight dipping system is switched on, the illumination area is limited further still, and the maximum width during OFF phases of the automatic headlight dipping system is determined by the motorway function in accordance with the method.

In one embodiment of the method, main beam distribution in the second motorway mode is reduced essentially to the right half of the main beam distribution in the base mode.

In one embodiment, an existing traffic density is captured. In this context, the controller can be switched into a third motorway mode with the maximum main beam width, if the current vehicle speed exceeds a third predefined speed threshold and the current traffic density falls below a predefined maximum traffic density. In this way, it is possible to avoid limiting the maximum main beam width unnecessarily if traffic is light or if motorways are almost empty (e.g. at two o'clock in the morning).

In one embodiment of the method, the current traffic density is captured on the basis of the number of oncoming vehicles. In this context, the predefined maximum traffic density may be determined as a predefined maximum number of oncoming vehicles within a third predefined period of time. In this way, the number of oncoming vehicles may be calculated using simple sensor technology, without precise position finding or sophisticated spatial resolution.

In one embodiment, the method is not activated in the base mode until a minimum speed is exceeded. This activation threshold serves to prevent unnecessary activations of the motorway modes, and the unnecessary limitations of headlight performance associated therewith. A controller tasked with controlling the headlights is also not subjected to unnecessary queries.

In one embodiment of the method, the headlight system includes at least one LED matrix headlight with a plurality of LEDs that are controllable individually or in clusters. In this context, certain positions of the main beam may be partially dimmed simply, without any mechanical screening means. For example, the outer left segments of the illumination area can be darkened to achieve the desired limitation of the die main beam width according to the first motorway mode by deactivating certain LED matrix elements.

In one embodiment, the controller is shifted from the first motorway mode back to the base mode if the current vehicle speed exceeds a fourth predefined speed threshold or the current bend radius exceeds a fourth predefined bend radius threshold continuously for a fourth predefined time period, while the controller is in the first motorway mode.

In one embodiment, the controller is shifted from the second motorway mode back to the first motorway mode if the current vehicle speed exceeds a fifth predefined speed threshold or the current bend radius falls below the second predefined bend radius threshold for a fifth predefined period of time.

The fourth predefined speed threshold may be lower than the first speed threshold, 5 to 20% lower, for example and the fifth predefined speed threshold may in turn be lower than the second speed threshold, 5 to 20% lower, for example. In this way, a hysteresis is built into the shifting behavior, to avoid confused switching between the individual control modes, which may in turn make the driver more nervous.

In one embodiment, the controller is shifted back from the third motorway mode back to the second motorway mode if the current vehicle speed falls below a sixth predefined speed threshold or the current traffic density does not fall below a predefined maximum traffic density continuously for a predefined sixth time period. Thus, the controller is switched back to the second motorway mode with limited main beam width if the traffic density has increased sufficiently in the meantime.

In one embodiment, the controller is switched to the first motorway mode from the base mode immediately, particularly without consideration for the current timer status, if the vehicle speed exceeds a preset gear changing speed. For example, if an acceleration operation results in a speed that is unlikely for a rural road (e.g., 150 kph), it may be safely assumed that the vehicle is being driven on a motorway. In this case, the timer is ignored and a motorway mode is made available immediately.

According to a further aspect of the present disclosure, a controller for a motor vehicle is described that is designed to carry out the method according to the first aspect of the present disclosure. In this context, the controller includes a receiver interface for receiving data that represents information about a current driving situation of the vehicle that has been measured locally at the vehicle, a timer with a current timer status, and an evaluation unit for determining on the basis of the received data and the current timer status whether a current control mode matches a control mode from at least two control modes that is assigned to the detected driving status, wherein each has an associated, predetermined maximum main headlight beam width. The controller further includes an output interface for outputting signals to a headlight control unit. The evaluation unit is designed to command the output interface to send signals for switching the headlight control unit to a control mode with a maximum main beam width adapted to the current driving situation.

In one embodiment, the receiver interface is designed to receive data that represents information about a current environment of the motor vehicle, and wherein the evaluation unit is designed to calculate a current traffic density, determined according to a number of oncoming vehicles within a predefined time period, and on the basis of this information to command the output interface to send signals to the headlight control unit for switching the headlight control unit to a control mode with a maximum main beam width adapted to the current driving situation and the current traffic density.

According to one aspect of the present disclosure, a device for controlling a headlight control system of a motor vehicle is described that includes a sensor device for locally capturing a driving status of the vehicle, a headlight control unit for controlling a headlight system of the vehicle, and a controller as described according to an aspect of the present disclosure, which is connected to the sensor device and the headlight control unit.

In one embodiment, the sensor device includes a yaw rate sensor for detecting a current turning or bend radius and an environment sensor for detecting the current surroundings of the motor vehicle.

According to a further aspect of the present disclosure, a device for controlling a motor vehicle headlight system is provided, which can be controlled in at least two control modes, each having an associated, predetermined maximum main beam width, and which includes: means for detecting a current driving situation of the vehicle on the basis of at least one operating parameter measured locally on the vehicle, means for using the captured current driving situation and at least one time or temporal parameter to determine whether a current control mode matches a control mode of the least two control modes that is assigned to the captured driving status, and means for shifting the control to the assigned control mode if the current control mode does not match the assigned control mode, so that a maximum main beam width adapted to the current driving situation may be set.

According to a further aspect of the present disclosure, a computer software product is suggested for controlling a headlight system of a motor vehicle, which system may be actuated in at least two control modes, each having an associated predetermined maximum main beam width. When the computer software product is run on a computing unit of a vehicle, the computing unit is configured to capture a current driving situation of the vehicle on the basis of at least one locally measured operating parameter of the vehicle, use the captured current driving situation and at least one time or temporal parameter to determine whether a current control mode matches a control mode of the least two control modes that is assigned to the captured driving status, and shift the control to the assigned control mode if the current control mode does not match the assigned control mode, so that a maximum main beam width adapted to the current driving situation may be set.

According to a further aspect of the present disclosure, a computer-readable medium is provided, on which the computer software product is stored.

According to a further aspect of the present disclosure, a vehicle having a device according to any one of the aspects of the present disclosure is described, wherein a sensor device is connected to at least one sensor of the vehicle, and a headlight control unit is connected to a headlight system of the vehicle. In one embodiment, the vehicle includes an environment sensor, which is arranged in a frontal area of the vehicle. In one embodiment, the environment sensor has the form of an optical sensor. In this context, the optical sensor is preferably arranged in a frontal area of the vehicle. In this way, it may be ensured that the vision field of the optical sensor coincides with at least sections of the light cone of the motor vehicle's headlights, which serve to light the road on which the vehicle is travelling.

According to one embodiment, the optical sensor is a camera. For example, camera systems integrated in standard motor vehicles are known, in order to deliver data for a wide range of driver assistance systems, for example, so that the function thereof may be used without the need for making complicated, expensive conversions. For example, the optical sensors may be a component of a blind spot monitoring system for observing vehicles that are overtaking or travelling in an adjacent lane, wherein the sensors may consist of at least one camera in the mirror or close to the vehicle's mirror.

According to another embodiment, the optical sensor is a radar device. Radar is the term generally understood to denote position finding equipment that works using electromagnetic waves outside of the visible spectrum, the radio frequency range. Accordingly, radar is particularly suitable for detecting vehicles that may be overtaking on poorly lit roads. Radar systems are also known as necessary components in many driver assistance systems, for example to assist a driver in traffic, when changing lanes, for example, so that the function thereof may be used without the need for making complicated, expensive conversions.

The optical sensor may also be a LIDAR system. The basic function of a LIDAR systems consists in measuring distance. The instrument emits laser pulses and detects the light that is reflected back from an object. An object can be detected, and particularly a distance from the object can be calculated on the basis of the travel time of the signals and the speed of light. In this way, the light from a laser that bounces back from a surface of the object allows conclusions to be drawn regarding the speed and position of the object, for example of a possibly overtaking vehicle.

The optical sensor may also be any other kind of optical sensor that is capable of detecting a passing or oncoming motor vehicle.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
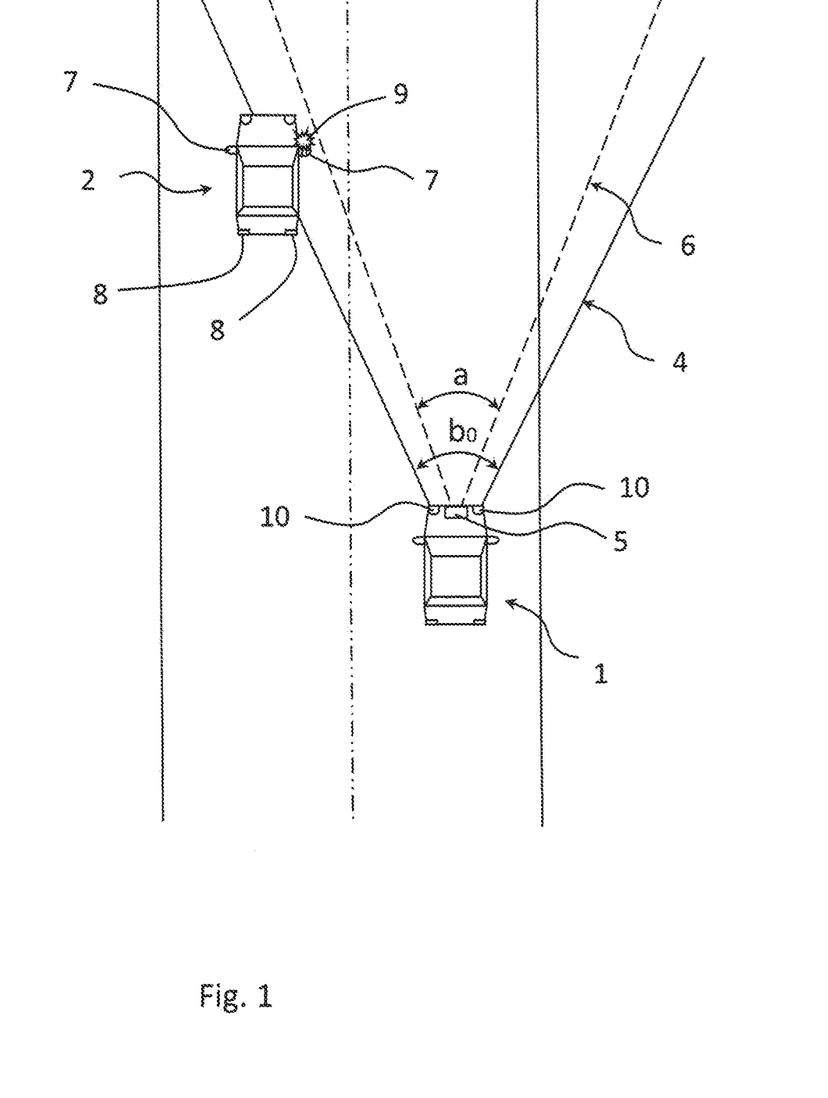
FIG. 1 is a diagrammatic representation of an overtaking maneuver, with one vehicle overtaking and one vehicle being overtaken, intended to explain how dazzle in the mirror occurs.

FIG. 1 is a diagrammatic representation of an overtaking maneuver, with one vehicle overtaking and one vehicle being overtaken, intended to explain how dazzle in the mirror occurs. First, FIG. 1 serves to explain how mirror dazzle occurs during an overtaking maneuver, if a method for preventing dazzle according to one of the aspects of the present disclosure is not implemented. A motor vehicle being overtaken 1 and an overtaking vehicle 2 with headlights 10 and taillights 8 are shown.

In this example, the headlights 10 of the motor vehicle being overtaken 1 are LED matrix headlights with individually actuatable elements. Headlights 10 have a main beam distribution which is described by a light cone. A light cone 4 of a main beam emitted by the LED matrix headlights 10 of motor vehicle 1 is represented diagrammatically by two solid lines. Light cone 4 has a cone angle $b_0$ that corresponds to a min beam width of LED matrix headlights 10, and in this example is equal to about +/−20°.

Motor vehicle 1 has an environment sensor in the frontal area thereof for the purpose of capturing the surrounding area, and which has the form of a camera 5. A detection range 6 of camera 5 is expressed by a camera cone angle a. Detection range 6 of the camera is represented diagrammatically in FIG. 1 by two dashed lines. Angle a is smaller than the width of main beam $b_0$, and has a value of about +/−19°. Thus, the detection range 6 of camera 5 lies entirely within light cone 4 of the main beam. Camera 5 is designed such that overtaking vehicles can be detected by their taillights. It is therefore not possible to recognize overtaking vehicle 2 as such until at least one of the taillights 8 of overtaking vehicle 2 passes into camera detection range 6.

In the phase of the overtaking maneuver illustrated in FIG. 1, part of motor vehicle 2 is captured in light cone 4. The right wing mirror 7 of vehicle 2 is already within light cone 4 and is thus in the dazzle area of the main beam of headlights 10 of the vehicle being overtaken 1. Camera 5 is not able to detect the taillights 8 of overtaking vehicle 2. A controlling system for an automatic headlight dipping system present in vehicle 1 cannot respond when vehicle 2 enters the dazzle area of vehicle 1, because vehicle 2 is not detected by camera 5, and consequently remains invisible to the controlling system in vehicle 1. In this constellation, it is possible that the driver of vehicle 2 may be dazzled via the right wing mirror, which is symbolized in FIG. 1 with a schematic representation of an explosion 9.

In the event of such dazzling via the mirror, the driver of overtaking motor vehicle 2 may be dazzled briefly by the wing mirror 7 on vehicle 2. This dazzling effect lasts for less than a second or few seconds. However, dazzling effects may be longer lasting or may be repetitive, in traffic travelling in parallel lanes, when vehicles 1 and 2 are travelling at approximately the same speed, and the configuration shown in FIG. 1 persists for a longer period or recurs repeatedly.

However, dazzling via the mirror can be prevented through a reduced main beam width by implementing the method according to an embodiment of the present disclosure in a main beam width headlight control mode provided in the method.

Figure 2:
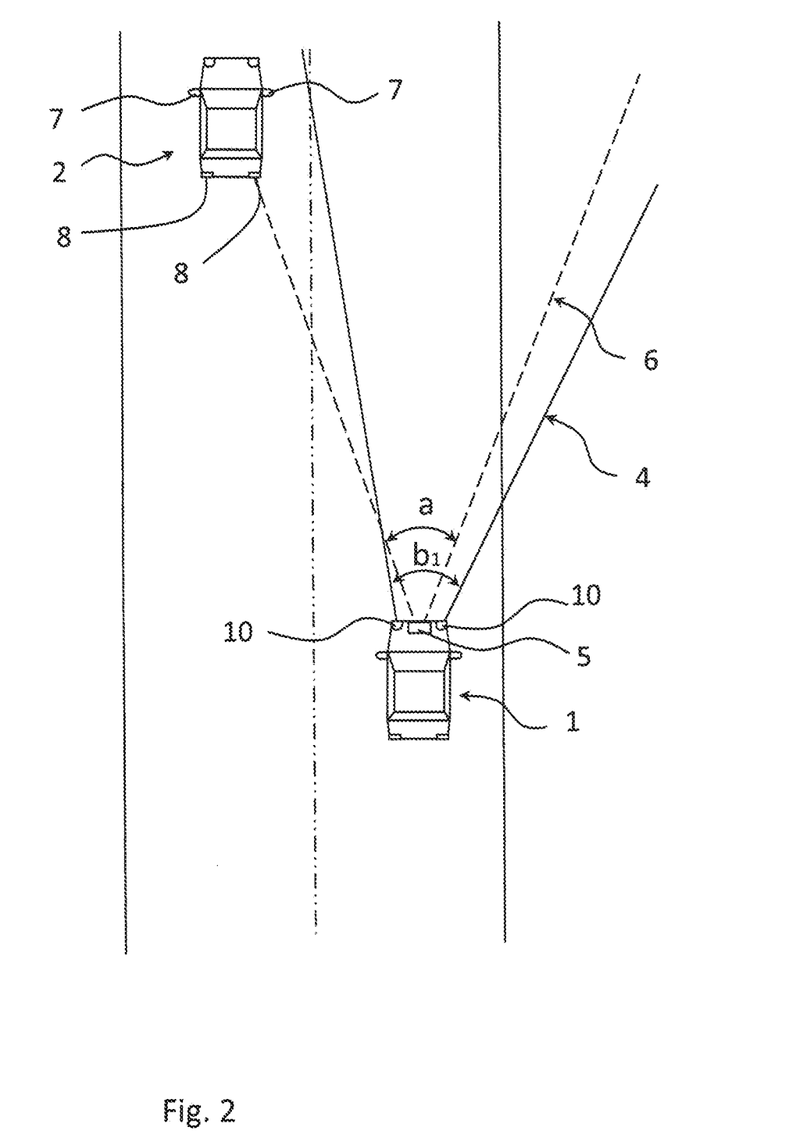
FIG. 2 is a diagrammatic representation of the overtaking maneuver of FIG. 1, using the method according to an embodiment of the present disclosure.

FIG. 2 is a diagrammatic representation of the overtaking maneuver of FIG. 1 with a reduced main beam width. In this example, motor vehicle 1 is equipped with a device for carrying out the method according to an embodiment of the present disclosure. By appropriate reduction of the main beam width to a predefined main beam width $b_1$ the right taillight 8 of the overtaking vehicle 2 is detected by camera 5 in the vehicle being overtaken 1, without the right wing mirror 7 of vehicle 2 passing into the main beam light cone 4 of vehicle 1. The main beam width is indicated in FIG. 2 by cone angle b1. In such case, the main beam distribution has been modified asymmetrically in such manner that essentially only the left side of the light distribution of LED matrix headlights 10 is limited by a deactivation of corresponding segments of the LED matrix headlights. The right side of the main beam distribution largely corresponds to the main beam distribution of FIG. 1, which is not limited or reduced, so that full lighting performance is maintained in the distribution of light on the right-hand side.

Figure 3:
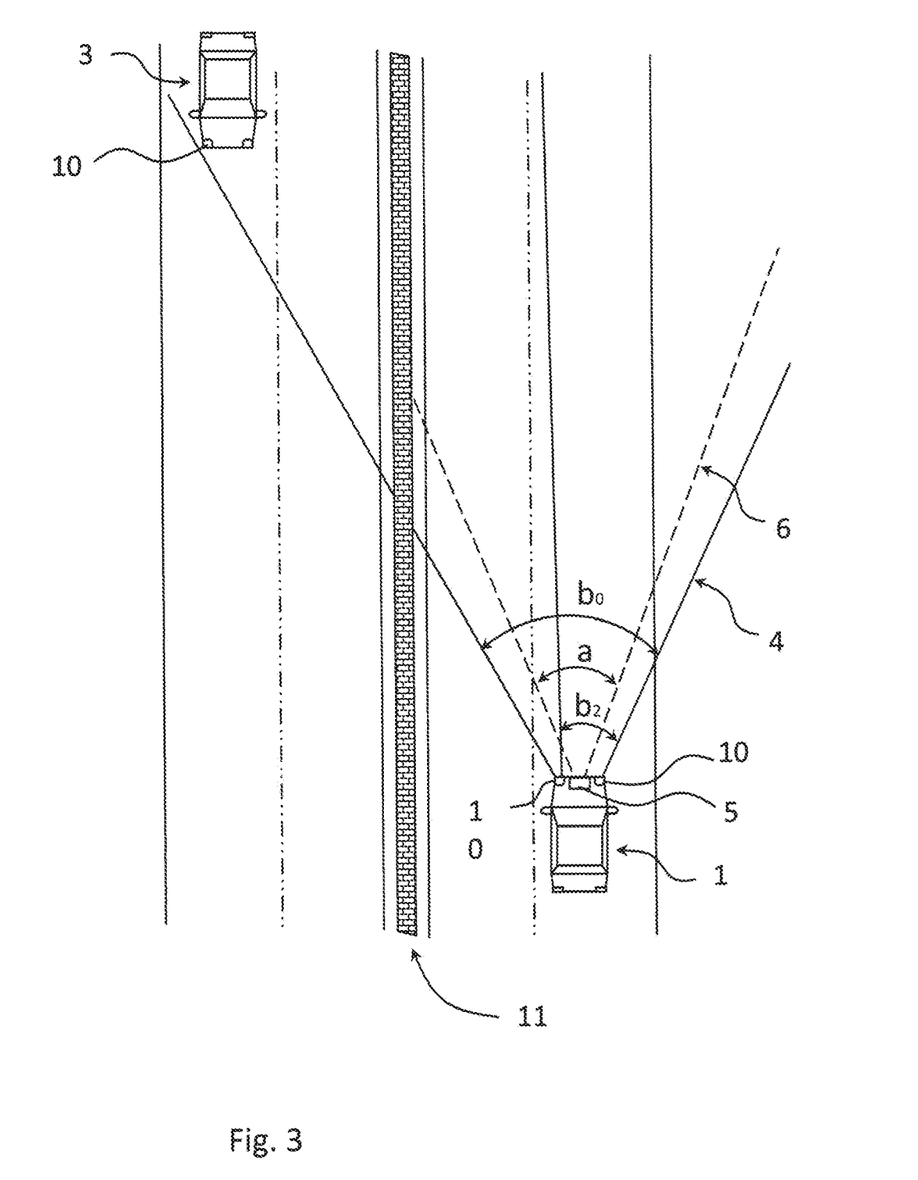
FIG. 3 is a diagrammatic representation of a motorway scenario with carriageways separated by structural elements in order to illustrate an embodiment of the present disclosure.

FIG. 3 is a diagrammatic representation of a motorway scenario with carriageways separated by structural elements in order to illustrate another embodiment of the present disclosure. The figure shows a motor vehicle 1 travelling on a motorway, and a vehicle 3 travelling in the opposite direction to vehicle 1. The headlights 10 of the vehicles are also shown. Motor vehicle 1 has a built-in camera 5 and corresponds to the vehicle 1 of FIG. 1, wherein the headlights 10 of vehicle 1 can be actuated according to a method according to one of the aspects of the present disclosure.

The motorway represented in FIG. 3 has carriageways separated by structural elements, with a visibility barrier 11 between the carriageways for traffic travelling in opposite directions. Because of the visibility barrier 11, the headlights 10 of oncoming motor vehicles 3 are not detected, or not detected in time, by the camera 5 built into vehicle 1. Consequently, the automatic headlight dipping system present in vehicle 1 cannot be activated in time to avoid dazzling the approaching motor vehicle 3.

In a control mode according to one embodiment of the present disclosure, the dazzle effect on oncoming vehicles is reliably suppressed even in the presence of such visibility barriers by suit-able reduction of the main beam width. FIG. 3 shows two different cone angles of light cone 4 of the main beam from motor vehicle 1. Cone angle $b_0$ corresponds to a full, maximum main beam width of headlights 10, with no reduction according to any of the control modes provided in the method. On the other hand, cone angle $b_2$ corresponds to a main beam width that has been limited according to a control mode. In this control mode, in this case the second motorway mode, the main beam with main beam width $b_2$ is essentially limited to the right half of the illumination area. In this way, oncoming traffic is not exposed to dazzle effects even if it is not detected by the environment sensor in motor vehicle 1.

Figure 4:
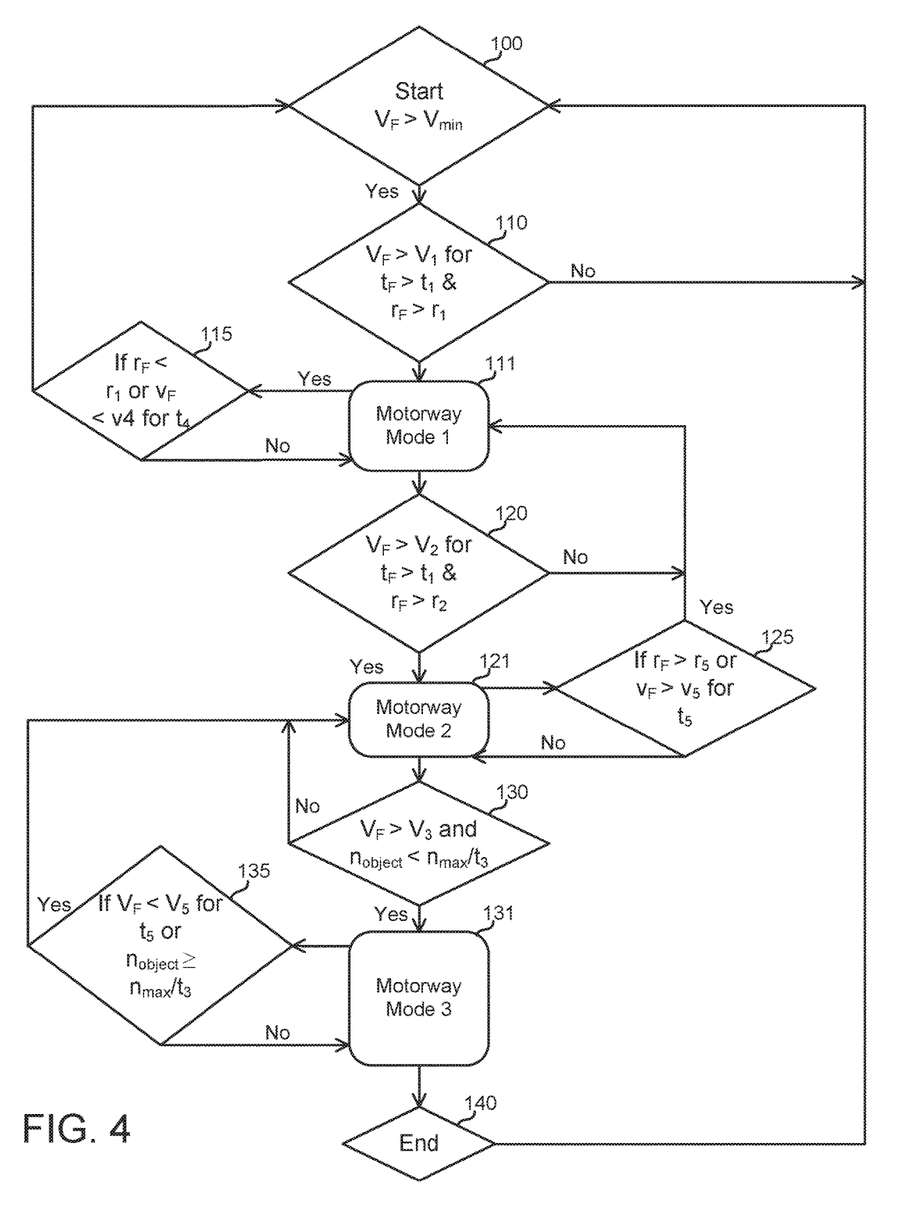
FIG. 4 shows a flowchart of an embodiment of a method according to the present disclosure.

FIG. 4 shows a flowchart of an embodiment of the method according to the present disclosure for controlling a motor vehicle's headlight system. The vehicle in this example corresponds to the motor vehicle 1 of FIGS. 1 to 3, and is designed in such manner that the method for controlling the headlight system can be carried out. The headlight system can be actuated with various control modes (100, 111, 121, 131), each of which has an associated, predetermined maximum main beam width ($b_0$, $b_1$, $b_2$). The flowchart illustrates for exemplary purposes the criteria that are considered before the system switches from one control mode to another control mode. According to the method represented, a current driving situation is captured on the basis of the at least one operating parameter of motor vehicle 1. In this example, a current vehicle speed $v_F$ and a current turning or bend radius $r_F$ are used as operating parameters for capturing the current driving situation. In one of the query steps (110, 115, 120, 125, 130, 135). It is determined on the basis of the captured current driving situation and the at least on time or temporal parameter whether a current control mode (100, 111, 121, 131) matches a control mode assigned to the captured driving status. In this context a current timer status $t_F$ serves as the time or temporal parameter. If it is determined in the course of any of the query steps (110, 115, 120, 125, 130, 135) that the current control mode does not match a control mode (100, 111, 121, 131) assigned to the current driving situation, the controller is switched to the assigned control mode, so that a maximum main beam width adapted to the current driving situation may be set.

In a base mode 100 having a maximum main beam width $b_0$, in a first step 100 it is determined whether the prerequisite conditions for carrying out further queries according to the embodiment are satisfied. This is the case when the current vehicle speed exceeds a minimum speed $v_{min}$. In this example, minimum speed $v_{min}$ has a value of 100 kph. This speed corresponds to a moderate motorway driving speed, so that a vehicle travelling at this speed might already be located on a fast road or a motorway. In base mode 100, full use is made of the main beam width, i.e., the maximum main beam width $b_0$ in base mode 100 corresponds to the full main beam, with no limitation by any suppressing functions on headlight system 52.

If the minimum speed $v_{min}$ is exceeded in base mode 100, it is ascertained in query step 110 whether the current vehicle speed $v_F$ exceeds a first predefined speed threshold $v_1$ and the current bend radius $r_F$ exceeds a first predefined bend radius threshold $r_1$, each continuously for a first predefined minimum time period $t_1$, in other words whether $v_F > v_1$ and $r_F > r_1$ for $t_F > t_1$. In this case, controller is switched from base mode 100 into a first motorway mode 111 with a first maximum main beam width $b_1$ that is limited compared to the maximum main beam width of base mode $b_0$ in order to avoid dazzling a motor vehicle 2 ahead of the first vehicle via its mirrors. In this example, first speed threshold $v_1$ is 114 kph, $t_1$ is 2 min, and bend radius threshold $r_1$ is 425 m, which corresponds to a minimum radius of motorway bends that is widely standardized in Europe. These parameters may be modified to reflect both different countries and different terrains. If bend radius threshold $r_1$ or speed threshold $v_1$ is exceeded only for a short time, but these values subsequently fall to levels below these threshold values before the status of timer $t_F$ reaches minimum time $t_1$, the timer is reset so that counting of the timer status $t_F$ can begin from zero again the next time the threshold values $v_1$ and $r_1$ are exceeded, and the headlight controller remains in base mode as long as the prerequisite conditions of method step 110 are not satisfied. Only when the condition $v_F > v_1$ and $r_F > r_1$ is fulfilled for the entire time period $t_1$ is the controller switched from base mode 100 to first motorway mode 111 by the controller.

When first motorway mode 111 is accessed, the main beam distribution is limited in such a way that the traffic ahead of the vehicle in question is not dazzled by the main beam. In this context, the two outer segments of the left illumination area are suppressed by deactivation of the corresponding areas in the LED matrix, so that a motor vehicle travelling ahead is captured by camera 5 before the right wing mirror 7 of motor vehicle 2 passes into light cone 4 (see also FIG. 2). After switching to the first motorway mode 111 in a next query step 120 it is ascertained whether the current vehicle speed $v_F$ has exceeded a second predefined speed threshold $v_2$ and the current bend radius $r_F$ has exceeded a second predefined bend radius threshold $r_2$, each continuously for a second predefined time period $t_2$. If this condition is satisfied, the controller is shifted from the first motorway mode 111 to a second motorway mode 121 with a second maximum main beam width $b_2$ which is limited compared with the maximum main beam width of base mode $b_0$ in order to avoid dazzling oncoming motor vehicles 3. The threshold values for $v_2$ may be 10-20% higher than $v_1$, and $r_2$ may be equal to or greater than $r_1$. These threshold values correspond to a higher motorway speed or a higher motorway category. In this example, threshold value $v_2$ is in the order of 130 kph, while $r_2=r_1=425$ m.

After switching to the second motorway mode 121, the main beam distribution is limited still further, so that drivers of oncoming vehicles are not dazzled by the main beam. In this context, more segments of the left illumination area are suppressed by deactivation of the corresponding areas in the LED matrix, so that an oncoming vehicle is not caught in light cone 4 (see also FIG. 3). In this embodiment, therefore, $b_2<b_1$. And in the second motorway mode, the entire left half of the main beam distribution is essentially suppressed.

In the embodiment according to FIG. 4, a current traffic density is also detected, and in the second motorway mode it is ascertained in query step 130 whether the current vehicle speed $v_F$ exceeds a third predefined speed threshold $v_3$ and whether the current traffic density falls below a predefined maximum traffic density. In this case, the controller is switched to a third motorway mode 131. In this context, the current traffic density is defined according to a number of oncoming vehicles per unit of time. The predefined maximum traffic density is defined as a predetermined maximum number of oncoming motor vehicles $n_{max}$ within a third predetermined time period $t_3$.

In the third motorway mode 131, the maximum main beam width is equal to $b_0$, which means that the full extent of the main beam width is used, just as in base mode 100. In a query step 115 in first motorway mode 111 it is ascertained whether the current vehicle speed $v_F$ falls below a fourth predefined speed threshold $v_4$ or the current bend radius $r_F$ falls below a fourth predefined bend radius threshold $r_4$ continuously for a fourth predefined time period $t_4$. In this case, the controller is shifted back in to base mode 100 from first motorway mode 111. Thus, if the controller has been shifted back into first motorway mode 111, it stays in this mode until either the criterion 120 for switching to the second motorway mode 121 is satisfied or the criterion 115 for returning to the base mode 100 is satisfied.

$V_4$ is selected to be 5 to 20% lower than $v_1$, in order to avoid constant, irritating switching between the individual control modes with the aid of a hysteresis in the switching procedure. In this example the value for $v_4$ is 95 kph, $t_4$ is equal to 10 s, and $r_4$ may be equal to or smaller than $r_2$. In this example, $r_4=r_1=425$ m.

A query procedure 125 is carried out in second motorway mode 121 as well, and in this case a check is made to determine whether criteria for a return to first motorway mode 111 are satisfied. The controller is shifted from second motorway mode 121 to first motorway mode 111 if the current vehicle speed $v_F$ falls below a fifth predefined speed threshold $v_5$ or the current bend radius $r_F$ falls below a fifth predefined bend radius threshold $r_5$ for a fifth predefined time period $t_5$. Thus, if the controller has been shifted back into second motorway mode 121, it stays in this mode until either the criterion 130 for switching to the third motorway mode 131 is satisfied or the criterion 125 for returning to the first motorway mode 111 is satisfied.

$V_5$ is selected to 5 to 20% lower than $v_2$, to avoid constant, irritating switching between the individual control modes with the aid of a hysteresis in the switching procedure. In this example the value for $v_5$ is 95 kph, $t_5$ is equal to 10 s, and $r_5$ may be equal to or smaller than $r_2$. In this example $r_5=r_2=425$ m.

In the third motorway mode 131, a query 135 is carried out to which whether criteria for a return to the second motorway mode 121 are satisfied. This might be the case for example if the traffic density has increased in the meantime. Accordingly, the controller is then shifted from the third motorway mode 131 back into the second motorway mode 121, if the current vehicle speed $v_F$ falls below a sixth predefined speed threshold $v_6$ continuously for a predefined sixth time period $t_6$ or the number of oncoming vehicles does not fall below the predefined number $n_{max}$ within the third predefined time period $t_3$. Otherwise, the controller remains in the third motorway mode 131 until the method is ended in an end step 140.

$V_6$ may be selected to be 5 to 20% lower than $v_3$, to avoid constant, irritating switching between the individual control modes with the aid of a hysteresis in the switching procedure. In this example, $v_6$ is equal to 135 kph.

Although the examples shown in FIGS. 1 to 4 illustrate conditions in which driving is on the right, they can equally well be applied to driving on the left with a correspondingly mirrored reversal of positions.

Figure 5:
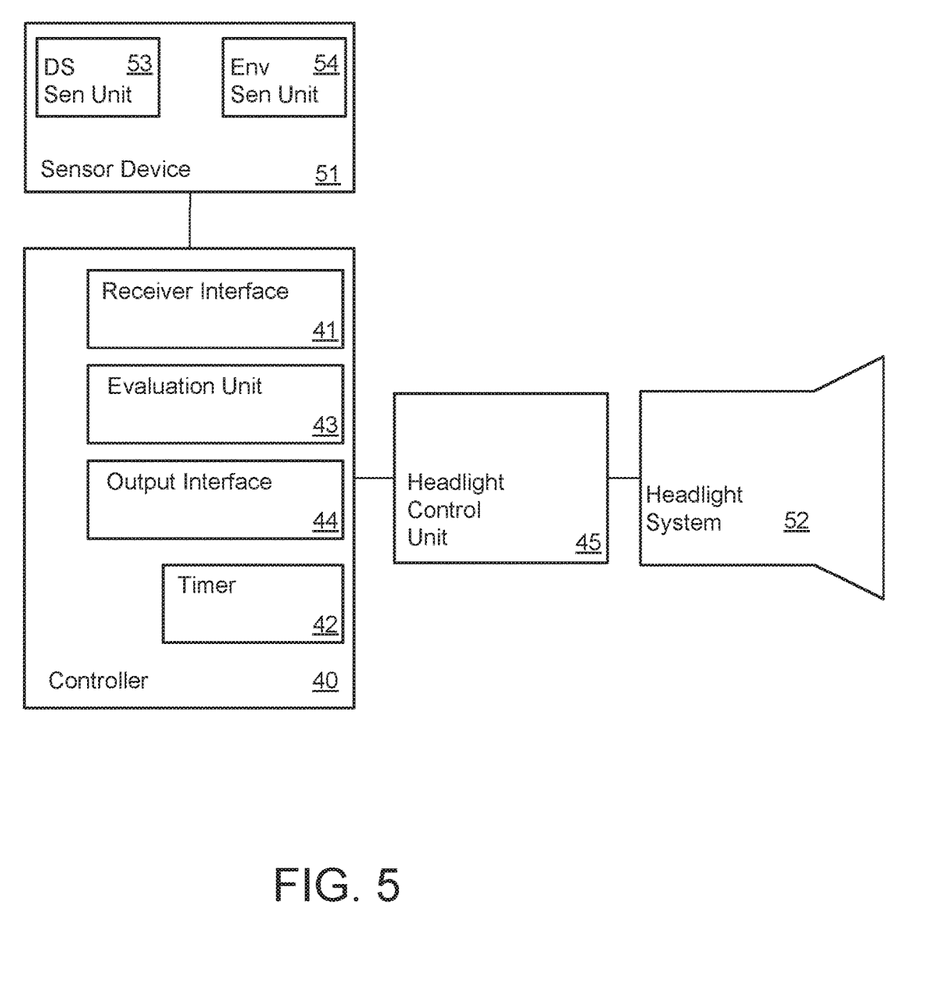
FIG. 5 shows a device for controlling a headlight control system of a motor vehicle according to an embodiment of the present disclosure.

FIG. 5 shows a device for controlling a headlight control system of a motor vehicle according to an embodiment of the present disclosure. Device 50 includes a sensor device 51 with a driving status sensor unit 53 for detecting a driving status of motor vehicle 1 and an environment sensor unit 54 for detecting an environment of the motor vehicle 1. Device 50 also includes a controller 40 and a headlight control unit 45 for controlling a headlight system 52 of motor vehicle 1. Sensor device 51 is designed to capture data from driving status sensor unit 53 and environment sensor unit 54.

In this context, controller 40 has a receiver interface 41 includes a receiver interface for receiving data that represents information about a current driving situation of the vehicle 1. The controller further includes a timer 42 with a current timer status, and an evaluation unit 43 for determining on the basis of the received data and the current timer status whether a current control mode matches a control mode from at least two control modes that is assigned to the detected driving status, wherein each has an associated, predetermined maximum main headlight beam width. Controller 40 further includes an output interface 44 for outputting signals to a headlight control unit 45.

The evaluation unit 43 is designed to command the output interface 44 to send signals to the headlight control unit 45 in order to switching headlight control unit 45 to a control mode 100, 111, 121, 131 with a maximum main beam width $b_0$, $b_1$, $b_2$, adapted to the current driving situation. The receiver interface 41 according to the embodiment shown in FIG. 5 is also designed to receive data that represents information about a current environment of the motor vehicle 1. Evaluation unit 43 is designed to calculate a current traffic density on the basis of this information, determined according to a number of oncoming vehicles 3 within a predefined time period $t_3$, and to command the output interface 44 to send signals to the headlight control unit 45 for switching the headlight control unit 45 to a control mode 121, 131 with a maximum main beam width $b_0$, $b_2$ adapted to the current driving situation and the current traffic density.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for controlling a headlight system of a motor vehicle, which can be actuated in at least two control modes, the method comprising:
   assigning a driving status to each of at least two control modes, wherein each control mode has a predetermined maximum main beam width associated therewith;
   capturing a current driving situation of the motor vehicle on the basis of at least one operating parameter measured locally at the motor vehicle;
   ascertaining when a current control mode matches one of the least two control modes on the basis of the captured current driving situation and at least one temporal parameter; and
   automatically shifting the headlight system into the assigned control mode when the current control mode does not match the assigned control mode so that the predetermined maximum main beam width is adapted to the current driving situation.

2. The method according to claim 1, wherein the at least one operating parameter comprises a current motor vehicle speed, and wherein the at least one temporal parameter comprises a current status of a timer.

3. The method according to claim 2, wherein the at least one operating parameter further comprises a current bend radius, and the method further comprises shifting the headlight system from a base mode having a maximum main beam width into a first motorway mode having a first maximum main beam width that is less than the maximum main beam width of the base mode when the current motor vehicle speed exceeds a first predefined speed threshold and the current bend radius exceeds a first predefined bend radius threshold, each continuously for a first predefined time period.

4. The method according to claim 3, wherein the method further comprises shifting the headlight system from the first motorway mode back into the base mode when in the first motorway mode the current motor vehicle speed falls below a fourth predefined speed threshold or the current bend radius falls below a fourth predefined bend radius threshold continuously for a fourth predefined time period.

5. The method according to claim 3, wherein the method further comprises shifting the headlight system the first motorway mode to a second motorway mode, having a second maximum main beam width that is less than the maximum main beam width of the base mode to avoid dazzling oncoming motor vehicles when the current motor vehicle speed exceeds a second predefined speed threshold and the current bend radius exceeds a second predefined bend radius threshold, each continuously for a second predefined time period.

6. The method according to claim 5, wherein the method further comprises:
   capturing a current traffic density; and
   shifting the headlight system into a third motorway mode with the maximum main beam width of the base mode when the current motor vehicle speed exceeds a third predefined speed threshold and the current traffic density falls below a predefined maximum traffic density.

7. The method according to claim 5, wherein the method further comprises shifting the headlight system from the second motorway mode back into the first motorway mode when the current motor vehicle speed falls below a fifth predefined speed threshold or the current bend radius falls below the fifth predefined bend radius threshold for a fifth predefined time period.

8. The method according to claim 7 wherein the method further comprises shifting the headlight system into the first motorway mode without consideration for the current timer status when the motor vehicle speed exceeds a preset gear changing speed.

9. A controller for a headlight system in a motor vehicle, comprising:
   a receiver interface for receiving data that represents information about a current driving situation of the motor vehicle measured locally at the motor vehicle;
   a timer configured to provide a current timer status;
   an evaluation unit configured to determine whether a current control mode matches a control mode from at least two control modes assigned to the captured driving status, each control mode having a predetermined maximum main beam width associated therewith on the basis of the received data and the current timer status; and
   an output interface for outputting signals to a headlight control unit;
   wherein the evaluation unit is configured to command the output interface to send signals to the headlight control unit for shifting the headlight control unit into a control mode having a maximum main beam width adapted to the current driving situation.

10. The controller according to claim 9 further comprising a sensor device for locally capturing a driving situation of the motor vehicle, and a headlight control unit connected to the sensor device for controlling a headlight system.

11. The controller according to claim 9, wherein the receiver interface is configured to receive data representing information about a current environment of the motor vehicle, and wherein the evaluation unit is configured to calculate a current traffic density using said information based on a number of oncoming motor vehicles within a predefined time period, and to command the output interface to send signals to the headlight control unit for shifting the headlight control unit into a control mode having a maximum main beam width adapted to the current driving situation and the current traffic density.

12. A motor vehicle comprising a controller according to claim 11 having a sensor device connected to at least one sensor of the motor vehicle, and a headlight control unit connected to a headlight system of the motor vehicle.

13. The motor vehicle according to claim 12, wherein the headlight system comprises at least one LED matrix headlight with a plurality of LEDs and the controller is configured to actuate the plurality of LEDs individually or in a cluster.

14. A non-transitory computer accessible storage medium, having instructions stored therein for controlling a headlight system of a motor vehicle which can be actuated with at least two control modes, each having an associated, predetermined maximum main beam width, wherein the instructions stored in the non-transitory computer accessible storage medium, when executed on a computing unit in the motor vehicle, instructs the computing unit to:
  capture a current driving situation of the motor vehicle on the basis of at least one operating parameter of the motor vehicle measured locally at the motor vehicle;
  ascertain whether a current control mode matches the control mode of the least two control modes assigned to the captured driving status on the basis of the captured current driving situation and at least one temporal parameter; and
  shift the controller into the assigned control mode when the current control mode does not match the assigned control mode, so that a maximum main beam width adapted to the current driving situation can be set.

\* \* \* \* \*